United States Patent
Verbree et al.

(10) Patent No.: US 10,764,201 B2
(45) Date of Patent: Sep. 1, 2020

(54) SYSTEM AND METHOD FOR SCHEDULING COMMUNICATIONS

(71) Applicant: DornerWorks Ltd., Grand Rapids, MI (US)

(72) Inventors: David Verbree, Hudsonville, MI (US); Brian Douglas, Byron Center, MI (US); Nicholas VanderStel, Ada, MI (US); Andrew DeZeeuw, Kentwood, MI (US); Juan Morales, Grand Rapids, MI (US); Eric Hughes, Hudsonville, MI (US); Corrin Meyer, Grand Rapids, MI (US); David Johnson, Grand Rapids, MI (US)

(73) Assignee: DornerWorks, Ltd., Grand Rapids, MI (US)

( * ) Notice: Subject to any disclaimer, the term of this patent is extended or adjusted under 35 U.S.C. 154(b) by 39 days.

(21) Appl. No.: 16/200,785

(22) Filed: Nov. 27, 2018

(65) Prior Publication Data

US 2019/0166062 A1  May 30, 2019

Related U.S. Application Data

(60) Provisional application No. 62/591,296, filed on Nov. 28, 2017.

(51) Int. Cl.
*H04L 12/863* (2013.01)
*H04L 29/08* (2006.01)
*H04L 29/06* (2006.01)

(52) U.S. Cl.
CPC .......... *H04L 47/6215* (2013.01); *H04L 65/80* (2013.01); *H04L 69/323* (2013.01)

(58) Field of Classification Search
None
See application file for complete search history.

(56) References Cited

U.S. PATENT DOCUMENTS 6,205,149 B1  3/2001  Lemaire et al.
6,226,267 B1  5/2001  Spinney et al.
(Continued)

FOREIGN PATENT DOCUMENTS

CN  101523812  9/2009
EP  1 796 313  6/2007
(Continued)

OTHER PUBLICATIONS

"FQTSS Overview", AVnu Testing Consortium, downloaded at https://www.iol.unh.edu/sites/default/files/knowledgebase/avnu/FQTSS_OVERVIEW.pdf, available at least from Oct. 14, 2015.
(Continued)

*Primary Examiner* — Christine T Duong
(74) *Attorney, Agent, or Firm* — Warner Norcorss +Judd LLP

(57) ABSTRACT

A communication interface controller for multiplexing data packet streams from a plurality of data packets to generate an output stream for transmission from an endpoint. The data packet streams may be multiplexed according to a QoS associated with each data packet stream and at a rate equal to or greater than a medium transmission rate. For the case of a 1 Gbps transfer rate or 125 MBps, the data packet streams may be multiplexed at a rate equal to or greater than 1 MHz, thereby providing gapless scheduling and transmission of the data packet streams.

21 Claims, 5 Drawing Sheets

(56) References Cited

U.S. PATENT DOCUMENTS

| | | |
|---|---|---|
| 6,426,943 B1 | 7/2002 | Spinney et al. |
| 6,430,184 B1 | 8/2002 | Robins et al. |
| 6,714,553 B1 | 3/2004 | Poole et al. |
| 7,369,495 B1 | 5/2008 | Lemaire et al. |
| 7,684,332 B2 | 3/2010 | Ray et al. |
| 7,765,294 B2 | 7/2010 | Edwards et al. |
| 7,808,918 B2 | 10/2010 | Bugenhagen |
| 7,940,735 B2 | 5/2011 | Kozisek et al. |
| 7,948,909 B2 | 5/2011 | Bugenhagen et al. |
| 7,987,228 B2 | 7/2011 | McKeown et al. |
| 8,000,318 B2 | 8/2011 | Wiley et al. |
| 8,015,294 B2 | 9/2011 | Bugenhagen et al. |
| 8,040,811 B2 | 10/2011 | Edwards et al. |
| 8,064,391 B2 | 11/2011 | Kozisek et al. |
| 8,098,579 B2 | 1/2012 | Ray et al. |
| 8,125,897 B2 | 2/2012 | Ray et al. |
| 8,130,793 B2 | 3/2012 | Edwards et al. |
| 8,179,910 B2 | 5/2012 | Diab et al. |
| 8,194,555 B2 | 6/2012 | Morrill et al. |
| 8,199,653 B2 | 6/2012 | Bugenhagen et al. |
| 8,223,654 B2 | 7/2012 | Bugenhagen |
| 8,223,655 B2 | 7/2012 | Heinz et al. |
| 8,224,255 B2 | 7/2012 | Coppage et al. |
| 8,228,791 B2 | 7/2012 | Bugenhagen et al. |
| 8,238,253 B2 | 8/2012 | Morrill |
| 8,238,347 B2 | 8/2012 | DeSanti et al. |
| 8,274,905 B2 | 9/2012 | Edwards et al. |
| 8,307,065 B2 | 11/2012 | McNaughton et al. |
| 8,407,765 B2 | 3/2013 | Wiley et al. |
| 8,488,447 B2 | 7/2013 | Bugenhagen et al. |
| 8,509,082 B2 | 8/2013 | Heinz et al. |
| 8,537,695 B2 | 9/2013 | Wiley et al. |
| 8,619,596 B2 | 12/2013 | Wiley et al. |
| 8,767,752 B1 | 7/2014 | Tripathi et al. |
| 9,558,147 B2 | 1/2017 | Concer et al. |
| 2004/0252722 A1 | 12/2004 | Wybenga et al. |
| 2005/0021766 A1 | 1/2005 | McKeowen et al. |
| 2005/0027851 A1 | 2/2005 | McKeown et al. |
| 2005/0135396 A1 | 6/2005 | McDaniel et al. |
| 2005/0185582 A1 | 8/2005 | Wybenga et al. |
| 2006/0007854 A1 | 1/2006 | Yu |
| 2006/0277346 A1 | 12/2006 | Doak et al. |
| 2007/0245033 A1 | 10/2007 | Gavrilescu et al. |
| 2007/0268823 A1 | 11/2007 | Madison et al. |
| 2008/0002677 A1 | 1/2008 | Bugenhagen et al. |
| 2008/0002711 A1 | 1/2008 | Bugenhagen |
| 2008/0049628 A1 | 2/2008 | Bugenhagen |
| 2008/0049637 A1 | 2/2008 | Morrill et al. |
| 2008/0049639 A1 | 2/2008 | Wiley et al. |
| 2008/0049746 A1 | 2/2008 | Morrill et al. |
| 2008/0049747 A1 | 2/2008 | McNaughton et al. |
| 2008/0049787 A1 | 2/2008 | McNaughton et al. |
| 2008/0052387 A1 | 2/2008 | Heinz et al. |
| 2008/0052394 A1 | 2/2008 | Bugenhagen et al. |
| 2008/0212613 A1 | 9/2008 | Perkinson et al. |
| 2009/0073882 A1* | 3/2009 | McAlpine ............... H04L 47/10 370/235 |
| 2009/0292575 A1 | 11/2009 | Ellebracht et al. |
| 2009/0323525 A1 | 12/2009 | Chen et al. |
| 2010/0067539 A1 | 3/2010 | Lin et al. |
| 2012/0321052 A1 | 12/2012 | Morrill et al. |
| 2012/0327816 A1 | 12/2012 | Morrill et al. |
| 2012/0330804 A1 | 12/2012 | Morrill et al. |
| 2013/0003757 A1* | 1/2013 | Boatright ............. H04J 3/0697 370/474 |
| 2013/0003863 A1* | 1/2013 | Hutchings .......... H04N 21/4183 375/240.25 |
| 2013/0304903 A1 | 11/2013 | Mick et al. |
| 2015/0009823 A1 | 1/2015 | Ganga et al. |
| 2015/0071292 A1 | 3/2015 | Tripathi et al. |
| 2015/0222533 A1 | 8/2015 | Birrittella et al. |
| 2015/0254088 A1 | 9/2015 | Chou et al. |
| 2016/0044695 A1 | 2/2016 | Gunner |
| 2016/0065448 A1 | 3/2016 | Loveless |
| 2016/0182394 A1 | 6/2016 | Kiessling |
| 2016/0183351 A1 | 6/2016 | Snyder et al. |
| 2017/0054770 A1 | 2/2017 | Wells et al. |

FOREIGN PATENT DOCUMENTS

| | | |
|---|---|---|
| ES | 2 425 602 | 10/2013 |
| GB | 2 403 628 | 1/2005 |
| GB | 2 411 314 | 8/2005 |
| JP | 5801383 | 10/2015 |
| WO | 00/60899 | 10/2000 |
| WO | 2007/047866 | 4/2007 |
| WO | 2010/094595 | 8/2010 |
| WO | 2011/140028 | 11/2011 |

OTHER PUBLICATIONS

Cheung, Ken, "Lattice HiGig MAC IP Core for LatticeECP3 FPGA Devices", FPGA Blog, downloaded at http://fpgablog.com/posts/tag/media-access/, posted Nov. 29, 2010.

"IEEE 802.1AS Hardware Protocol Stack", published by Cast, Inc., downloaded at http://www.cast-inc.com/ip-cores/interfaces/automotive/ieee802_1as/cast_ieee802_1as-a.pdf, dated Jun. 2017.

"Audio Video Bridging", published on Wikipedia, downloaded at https://en.wikipedia.org/wiki/Audio_Video_Bridging, printed Jul. 19, 2017.

* cited by examiner

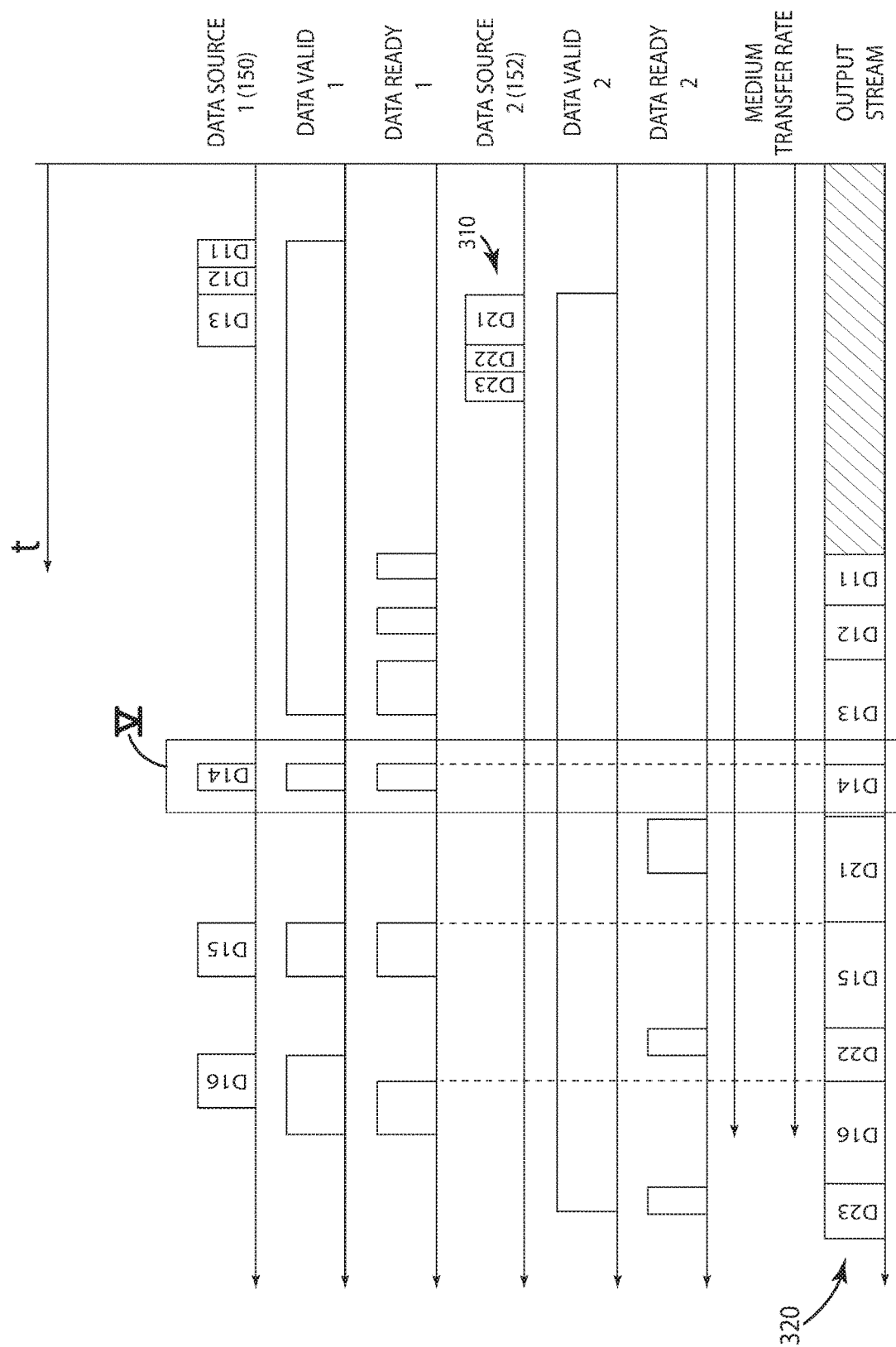

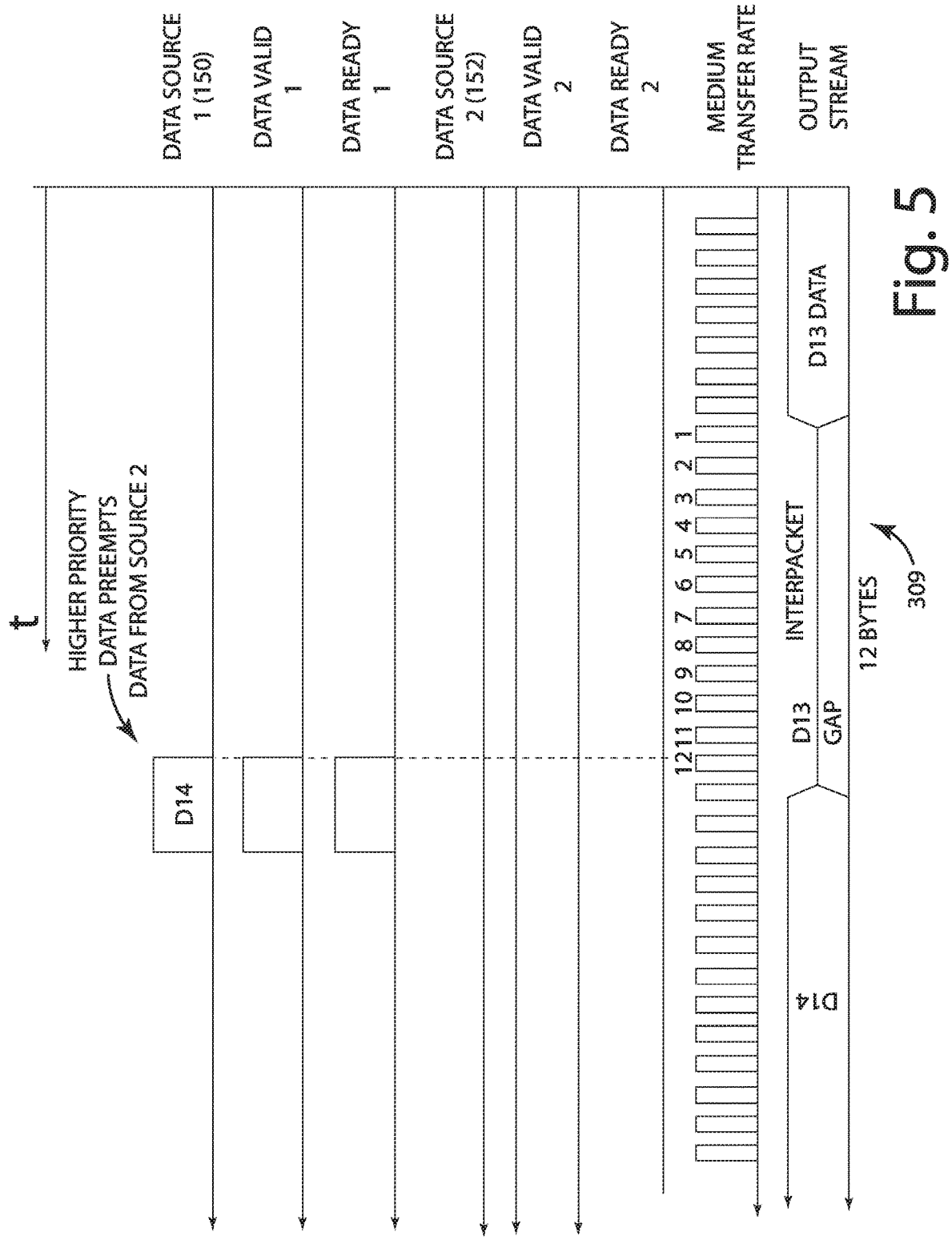

SYSTEM AND METHOD FOR SCHEDULING COMMUNICATIONS

STATEMENT REGARDING FEDERALLY SPONSORED RESEARCH AND DEVELOPMENT

This DornerWorks, Ltd. invention was made with U.S. Government support under Agreement No. W15QKN-14-9-1002 awarded by the U.S. Army Contracting Command-New Jersey (ACC-NJ) Contracting Activity to the National Advanced Mobility Consortium (NAMC). The Government has certain rights in the invention.

TECHNICAL FIELD

The present application relates to transmission of time-sensitive data from an end point, and more particularly toward deterministic transmission of the time-sensitive data.

BACKGROUND

Audio video bridging (AVB) technology has gained renewed interest in recent times. AVB started with a focus on protocols that allow time-synchronized low latency services through IEEE 802 networks, such as Ethernet, for audio and video transmissions.

More recently, efforts have been made to utilize AVB technology and related protocols, such as the Stream Reservation Protocol (SRP), for any type of time-sensitive stream. These efforts have been defined under the IEEE 801.1Q-2014 standard as Forwarding and Queuing of Time-Sensitive Streams (FQTSS). In one conventional implementation of FQTSS, multiple streams may be multiplexed to facilitate transmission across a physical layer (PHY) from an endpoint as a packet stream.

Conventional implementations of the FQTSS standard are considered wasteful with respect to bandwidth for a variety of reasons. The FQTSS standard describes, and conventional implementations utilize, bandwidth measurement intervals that occur at 125 us and 250 us. Each stream may include one or more packets that are aligned with a queue for transmission. Packets from each queue may be scheduled for transmission at each bandwidth measurement interval—e.g., every 125 us. If a particular queue is determined to have priority over other queues at this interval, the endpoint may schedule transmission of any packets in that queue. The number and size of the scheduled packets from this queue may vary and can amount to less than 125 us worth of information to transmit. As a result, in a conventional endpoint, if there is less than 125 us worth of packets scheduled for transmission, the endpoint transmits the scheduled packets and remains idle until the next bandwidth measurement interval occurs (125 us after scheduling packets for transmission). At the next bandwidth measurement interval, the next set of packets are scheduled for transmission. However, idle time during which no packets are sent is considered wasteful with respect to available bandwidth.

It should also be noted that the conventional scheduling described above can significantly limit deterministic operation for lower priority queues or classes of information. Consider, for example, the endpoint described above and where approximately 10 us worth of high priority packets queue every 110 us. The endpoint may not only waste bandwidth transmitting these high priority packets as described above, but also this reduced bandwidth limits the available bandwidth for the lower priority packets. As a result, the endpoint may become incapable of satisfying deterministic operation for more than a couple priority classes of packets. For instance, if there were four priority classes or queues, one of which is high priority in the example case provided, the available bandwidth to the remaining three priority classes may be significantly less than the full bandwidth of the communication link, and possibly less than the amount of bandwidth necessary to satisfy deterministic behavior for the remaining three priority classes.

SUMMARY OF THE DESCRIPTION

The present disclosure is directed to a communication interface controller for multiplexing a plurality of data packet streams to generate an output stream for transmission from an endpoint. The data packet streams may be multiplexed according to a QoS associated with each data packet stream and at a rate equal to or greater than a medium transmission rate. For the case of a 1 Gbps transfer rate or 125 MBps, the data packet streams may be multiplexed at a rate equal to or greater than 1 MHz (or an interval of 8 ns or less), thereby providing gapless scheduling and transmission of the data packet streams.

In one embodiment, an interface controller for controlling communications from an endpoint on a physical link is provided. The interface controller may include communications control circuitry, a data transfer interface, and a transmission scheduler. The communications control circuitry may be configured to direct transmission circuitry to transmit data bytes on the physical link, wherein the data bytes are transmitted on the physical link at a medium transfer rate according to an endpoint data signaling protocol. The data transfer interface may be configured to control receipt of first and second data packet streams via one or more data source physical links, where each of the first and second data packet streams is provided by a data source and includes one or more data packets. Each packet in any packet stream may have different lengths. For instance, at least one first data packet of the first data packet stream and at least one second data packet of the second data packet stream may have different lengths.

The one or more data source physical links may facilitate communications according to a data signaling protocol that is different from the endpoint signaling protocol. For instance, the data signaling protocol may be based on the AMBA bus standard, and the endpoint signaling protocol may be based on the 1000BASE-T standard defined in the IEEE 802.3 standard.

The transmission scheduler of the interface controller may be configured to multiplex the plurality of data packets from the first and second data packet streams to generate an output stream fed to the communications control circuitry for transmission on the physical link. The transmission scheduler may multiplex the plurality of data packets from the first and second data packet streams at a rate that is equal to or greater than the medium transfer rate.

In one embodiment, a method of multiplexing data packet streams from a plurality of data sources for transmission of data from an endpoint is provided. Each of the data packet streams may include a plurality of data packets that are variable with respect to a number of bytes included in each data packet of the plurality. The method may include directing receipt of the data packet streams from the plurality of data sources in accordance with a data source signaling protocol, and repeatedly determining, at a scheduler rate, whether to schedule transmission of a data packet from one of the plurality of data sources based at least in part on a priority class associated with each of the plurality of data sources. Transmission scheduling may also depend on one or more additional parameters, such as a parameter associated with FQTSS including the allocated bandwidth and the current number of credits for each QoS.

The method may also include transferring, in response to determining to schedule transmission of a data packet, the data packet to an output stream for transmission on a physical link at a medium transfer rate in accordance with an endpoint signaling protocol. The endpoint signaling protocol may be different from the data source signaling protocol, and the scheduler rate may be equal to or greater than the medium transfer rate.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 shows a timing diagram for a method of multiplexing data packet streams in accordance with one embodiment.

FIG. 5 shows an enlarged view of the timing diagram in FIG. 4.

DESCRIPTION

Figure 1:
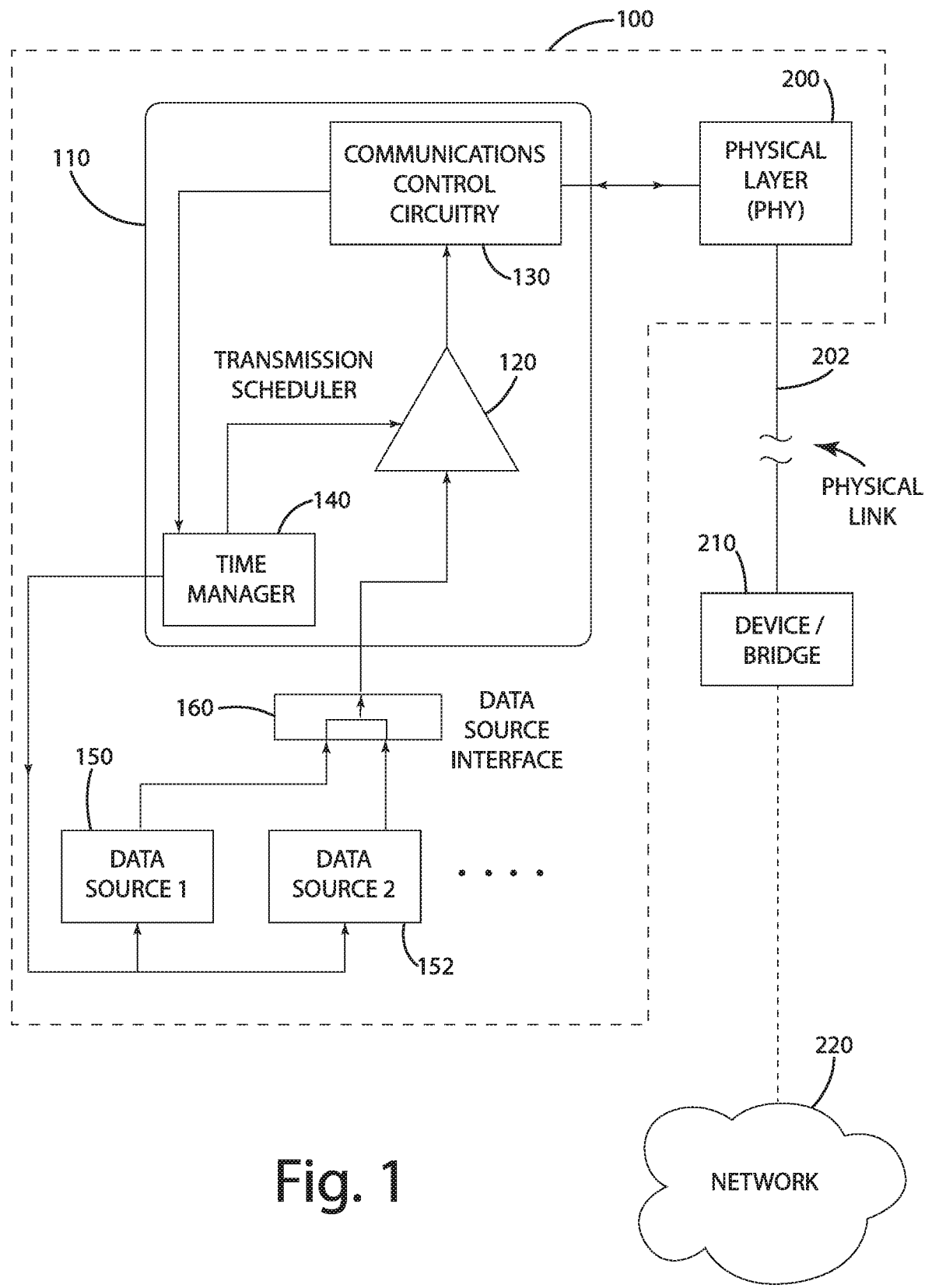
FIG. 1 shows a representative view of a communication interface controller in accordance with one embodiment.

A communication interface controller in accordance with one embodiment of the present disclosure is shown in the illustrated embodiment of FIG. 1 and generally designated 110. The communication interface controller 110 in the illustrated embodiment is incorporated into an endpoint 100 of a communication link through which communications can be transmitted and/or received via a physical link 202 in accordance with an endpoint signaling protocol. It should be understood that the present disclosure is not limited to the communication interface controller 110 being in an endpoint—the communication interface controller 110 may be incorporated into any device.

I. Overview

The endpoint 100 in the present disclosure is considered an endpoint of communications in accordance with the endpoint signaling protocol. The signaling protocol is considered a manner in which bits or symbols are communicated through the physical link 202, including, for example, the 1000BASE-T signaling protocol with 8b/10b encoding and four-dimensional (four-channel), five-level pulse amplitude modulation via copper. The endpoint 100 may include a physical layer 200 or PHY that is configured to transmit and receive communications via the physical link 202 and in accordance with the endpoint signaling protocol.

The endpoint signaling protocol may be based on one or more aspects of a communication protocol standard such as within the IEEE 802 body of standards. For instance, the endpoint signaling protocol may be defined as part of a class of standards that also define a data packet structure, such as the 1000BASE-T signaling protocol for communicating an Ethernet packet. For purposes of disclosure, the endpoint signaling protocol is considered separate from the data packet structure potentially utilized in conjunction with the endpoint signaling protocol.

In the illustrated embodiment, the endpoint signaling protocol is different from the data signaling protocol utilized for communicating with one or more data sources 150, 152. For instance, consider the case where communications are received in the endpoint 100 via the physical link 202 in accordance with the endpoint signaling protocol. These communications may be processed and/or forwarded to another device coupled to or incorporated into the endpoint 100 in accordance with the data signaling protocol such that the bits or symbols of the data packets are communicated in a different manner than the endpoint signaling protocol. In a more specific example, the endpoint signaling protocol may be Gigabit Ethernet implemented according to one of the IEEE 802.3 body of standards, such as 1000BASE-T communications via Cat 5, 5e, or 6 copper cabling. The different data signaling protocol utilized in this example may be based on the Advanced Microcontroller Bus Architecture (AMBA) standard that can be utilized for on-chip interconnects for transfer of information. This example is in contrast to a communication bridge or network bridge (e.g., bridge 210) provided on the physical link 202 that can receive communications in accordance with the endpoint signaling protocol and directly transmit these communications on another physical link in accordance with a signaling protocol that is substantially the same as the endpoint signaling protocol, such that no intermediate signaling protocol is utilized between receipt and transmission of communications.

In one embodiment, the data signaling protocol may be different from a class of signaling protocols associated with the endpoint signaling protocol. For instance, the endpoint signaling protocol may be based on any of the signaling protocols defined within the IEEE 802 body of standards, and the data signaling protocol utilized by the endpoint 100 may be based on any signaling protocol that is not defined within the IEEE 802 body of standards, including for example data signaling protocols different from the IEEE 802.3 1000BASE-T, -X signaling protocols and the IEEE 802.11 wireless signaling protocols.

The data signaling protocol utilized by the endpoint 100 may facilitate transmission and/or reception of data packets to/from one or more data sources 150, 152 via a data source interface 160. The data source interface 160 may include a physical link with the one or more data sources 150, 152, such as a wired bus architecture that is external and connected to logic (e.g., FPGA logic) of the communication interface controller 110. Additionally, or alternatively, the data source interface 160 may include a physical link with the one or more data sources 150, 152 that is incorporated into the logic of the communication interface controller 110.

These data packets may be communicated via the physical link 202 in accordance with the data signaling protocol. As discussed herein, the structure of the data packets communicated in accordance with the data signaling protocol may be substantially the same as the data packets communicated in accordance with the endpoint signaling protocol. Additionally, or alternatively, data packets received from the one or more data sources 150, 152 may be modified before being transmitted via the physical link 202. Additionally, or alternatively, data packets received via the physical link 202 in accordance with the endpoint signaling protocol may be modified before being transmitted to one or more data sources 150, 152 via the data source interface 160 in accordance with the data signaling protocol. Modifications may include adding a source identifier, ingress time-stamp, CRC, padding, interpacket gaps, or any other modification required by a communications protocol (e.g. IEEE 802.3).

In one embodiment, the structure of data packets received and transmitted via the data source interface 160 may be different from the structure of data packets received and transmitted via the physical link 202. Modifications may include adding a source identifier, adding a sequence number, adding a time-stamp, adding a CRC, encrypting data, decrypting data, compressing data, or decompressing data, or any combination thereof.

As discussed herein, in one embodiment, although the endpoint signaling protocol may be different from the data signaling protocol, the underlying arrangement of information in the data packets communicated via both the endpoint signaling protocol and the data signaling protocol may be substantially similar. In one embodiment, the structure of the data packets may be based on the same standard that forms the basis for the endpoint signaling protocol. As an example, the data packets may be based on the IEEE 802 standard and arranged in accordance with an Ethernet packet. In this way, the arrangement of information communicated in accordance with the data signaling protocol may be substantially the same as the arrangement of information communicated in accordance with the endpoint signaling protocol. However, the manner in which the information is transmitted via the physical link 202 may be different from the manner in which the information is transmitted via the data source interface 160. Alternatively, the arrangement of data packets communicated according to the endpoint signaling protocol and the data signaling protocol may be different—e.g., the data packets received via the data signaling protocol may be encrypted and/or compressed before being transmitted in accordance with the endpoint signaling protocol.

The physical link 202 may be any type of physical medium including optical fiber, copper, or space (e.g., via inductive coupling, via radio waves, or via light-based transmissions), or any combination thereof, through which signals representative of bits or symbols may be communicated, including any signaling link supported by the IEEE 802 body of standards. The physical link 202 may couple the endpoint 100 to an external device 210, such as another endpoint device or a network bridge (e.g., a network switch) through which communications may be routed to a network 220 defined by a plurality of devices capable of communicating with each other. A physical link 202 that comprises space may facilitate wireless communication in accordance with IEEE 802.11 (Wi-Fi).

For purposes of the disclosure, the endpoint 100 is described in connection with the one or more data sources 150, 152 and a communications link established via the physical link 202. It should be understood that the endpoint 100 may form part of a larger system of components that may communicate with each other in addition to or alternative to the external device 210 via the communication interface controller 110 and the physical link 202.

II. Communications Control Interface

Figure 2:
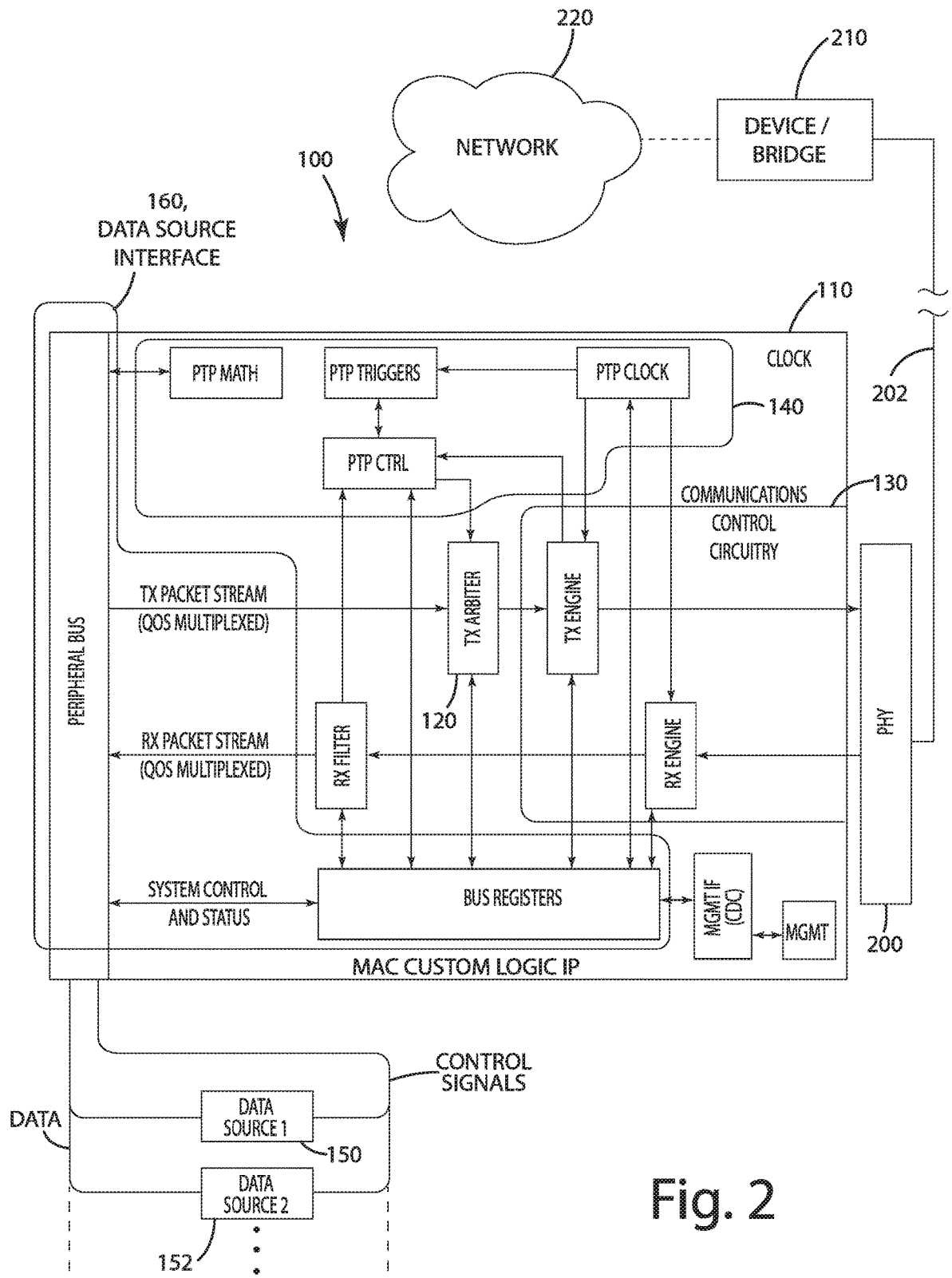
FIG. 2 shows a representative view of the communication interface controller in one embodiment.

The communication interface controller 110 in accordance with one or more embodiments is depicted in FIGS. 1 and 2, and may include one or more of the following: a clock or time manager 140, a transmission scheduler 120, and a data source interface 160. FIG. 1 provides a representative view of the communication interface controller 110—but it should be understood that the communication interface controller 110 may be implemented in a variety of ways, including via software instructions being executed on a processor (not shown) and/or via hardware. In the illustrated embodiment, the communication interface controller 110 is implemented in hardware, such as a Field Programmable Gate Array (FPGA) or an Application Specific Integrated Circuit (ASIC). In one embodiment, all or portions of the communication interface controller 110 may be implemented in hardware and facilitate routing communications between the physical layer 200 and the data source interface 160 without utilizing external memory or a hard processor for such communications.

In the illustrated embodiment, the communication interface controller 110 may include one or more conventional aspects of a medium access controller (MAC) that is at least partially defined in the IEEE 802 body of standards—it should be understood that the communication interface controller 110 is configured to operate differently from a conventional MAC as discussed herein.

The communications control circuitry 130 of the communication interface controller 110 in the illustrated embodiment may direct operation of the physical layer 200 to transmit and/or receive data packets. With respect to the illustrated embodiment, the communications control circuitry 130 may direct the physical layer 200 to transmit a multiplexed data packet stream (or an output stream) including data packets from at least two data sources 150, 152. The multiplexed data packet stream includes a plurality of data packets that may be structured in accordance with a communications protocol and that may be communicated by the physical layer 200 via the physical link 202 according to the endpoint signaling protocol. The communications protocol in the illustrated embodiment is based on the IEEE 802.3 standard such that the data packets correspond to an Ethernet packet. It should be understood that the structure of the data packets may be based on a different standard or agreed upon protocol.

The physical layer 200 may be circuitry configured to transmit and/or receive data according to the endpoint signaling protocol, as discussed herein. For instance, the physical layer 200 may include transceiver circuitry configured to provide galvanic isolation (in the case of a copper-based physical link 202) and allow transmission and reception of signal according to the endpoint signaling protocol. The endpoint signaling protocol may communicate bytes or symbols at a medium transfer rate. For instance, the 1000BASE-T transfer rate as discussed above may facilitate transmission of data over the physical link at 1 Gigabit per second (1 Gbps) or 125 Megabytes per second (125 MBps). As a result, the period for each byte transmission is substantially 8 ns.

In the illustrated embodiment, the communications control circuitry 130 includes a transmitter engine and receiver engine implemented in hardware (e.g., an FPGA instantiation). The transmission engine may be configured to transfer a data packet stream to a media-independent interface, such as a gigabit media-independent interface (GMII) and/or a reduced gigabit media-independent interface (RGMII). The media independent interface facilitates conditioning the data packet stream for transmission independent of the type of media or medium being utilized and independent of the type of endpoint signaling protocol. This way, the physical layer 200 and the communications control circuitry 130 may be implemented separately and independently of each other, enabling the communications control circuitry 130 to be used in conjunction with a variety of physical links 202 (e.g., space or copper) and a variety of endpoint signaling protocols (e.g., 802.11 or 1000BASE-T). The physical layer 200 may be implemented or configured separate from the communications control circuitry 130 so that, depending on the application (e.g., fiber or copper), the physical layer 200 may be selected to enable interoperability with the communications control circuitry 130.

The receive engine of the communications control circuitry 130 may be configured in a manner similar to the transmitter engine with the exception of being capable of receiving information via the media-independent interface instead of transmitting information.

The communications control circuitry 130 of the communication interface controller 110 may be configured to receive the multiplexed data packet stream from the transmission scheduler 120. As discussed herein, the transmission scheduler 120 may generate the multiplexed data packet stream from a plurality of data packet streams generated by a plurality of data sources 150, 152. The plurality of data sources 150, 152 may communicate the plurality of data packet streams to the transmission scheduler 120 via the data source interface 160. In the illustrated embodiment, the data source interface 160 is a peripheral bus adapted to facilitate communications according to the AMBA bus protocol.

The multiplexed data packet stream may include a plurality of data packets from each of the data packet streams generated by the plurality of data sources 150, 152 and arranged in time according to one or more quality of service (QoS) criteria. The transmission scheduler 120 may be configured to multiplex the plurality of data packet streams in a gapless manner and in accordance with the QoS criteria. This approach may substantially avoid wasting bandwidth associated with conventional efforts to determine QoS criteria at an interval much slower than the medium transfer rate, such as a conventional 125 us interval during which, for a 1 Gbps connection, 125,000 bytes may have been communicated.

The data source interface 160 in the illustrated embodiment may include one or more queues for storing data associated with the plurality of data packet streams generated from the plurality of data sources 150, 152. The one or more queues may be implemented in external logic or memory, and optionally, each data packet stream may be associated with its own queue.

In one embodiment, the data source interface 160 may be a peripheral bus shared by the plurality of data sources 150, 152 for communicating data packets to the transmission scheduler 120. In this configuration, the data source interface 160 may utilize control signals to facilitate receipt and storage of the data packet streams in the one or more queues. In other words, the control signals enable traffic control with respect to data on the data source interface 160, thereby controlling which of the data sources 150, 152 is communicating at any one time. The control signals may be configurable for each data source 150, 152 on the peripheral bus.

For instance, separate control signals may be provided to each data source 150, 152. The control signals may include a READY signal and a VALID signal. A first data source 150 may assert the VALID signal when it has data to transfer, and the data source interface 160 may assert the READY signal for the first data source 150 in order to allow the data source 150 to transfer its data to the data source interface 160.

In one embodiment, the control signals utilized by the data source interface 160 may facilitate control over reception of information from one or more of the plurality of data sources 150, 152 without a queue. To provide an example, the data source interface 160 may block the first data source 150 from communicating its data until the transmission scheduler 120 is ready to include such data in the multiplexed data packet stream that is provided to the communications control circuitry 130. When the first data source 150 has data it wants to transmit, the first data source 150 may assert the VALID signal. The data source interface 160 may wait to assert the READY signal until after the transmission scheduler 120 has determined to transmit such data from the first data source 150. This mode of operation may be described as asserting backpressure on one or more of the plurality of data sources 150, 152.

The backpressure mode of operation may enable control over a large number of device sources with little to no use of external memory in the communications interface circuitry 110 for data generated from the plurality of data sources 150, 152. Memory requirements for each device may be implemented on the device rather than the communications interface circuitry 110, thereby facilitating use of the communications interface circuitry 110 in a variety of applications with little to no modification to accommodate varying memory requirements associated with the plurality of data sources 150, 152.

In one embodiment, the communication interface controller 110 may include a time manager 140 or a clock manager that synchronizes a local clock of the communication interface controller 110 to a grand master clock associated with the external device 210 (or a device included in the network 220). The time manager 140 of the communication interface controller 110 in one embodiment may implement a generalized precision time protocol (gPTP) standardized in IEEE 802.1AS and IEEE 802.1AS-REV, to synchronize and syntonize the local clock of the communication interface controller 110 to the grand master clock. The time manager 140 may synchronize and syntonize the local clock to the grand master clock to facilitate operation of the communication interface controller 110 and communications with the plurality of data sources 150, 152.

In one embodiment, the time manager 140 may provide clock information to one or more of the plurality of data sources 150, 152 to synchronize and syntonize the local clocks of the one or more data sources 150, 152 to the local clock of the communication interface controller 110. Additionally, or alternatively, the time manager 140 may provide direct clock information to the one or more data sources 150, 152 to facilitate synchronous operation of the one or more data sources 150, 152. For instance, the one or more data sources 150, 152 may generate data packets in accordance with one or more timer based interrupts, which may be triggered directly by the time manager 140. By synchronizing activation of these interrupts, the one or more data sources 150, 152 may indicate to the communication interface controller 110 that data is ready at substantially the same time—this way, the QoS criteria can be applied in a consistent manner with respect to data communicated or available across the plurality of data sources 150, 152.

It also should be noted that the time manager 140, by providing clock information directly or indirectly to the plurality of data sources 150, 152, may facilitate a substantial reduction in the complexity of the data sources 150, 152. This is because the data sources 150, 152 may no longer need to allocate resources to managing time.

In one embodiment, because the local clocks of each of the data sources 150, 152 may be synchronized and syntonized with the grand master clock, data packets generated from the respective data sources 150, 152 may be fusible at a later stage after being multiplexed and transmitted via the physical link 202. For instance, a first data packet generated from the first data source 150 may be time stamped at a time $t_1$, and a second data packet generated from the second data source 152 may be time stamped at a time $t_2$. Because the local clocks for each of the first and second data sources 150, 152 are synchronized and syntonized with each other, the time stamps $t_1$ and $t_2$ are relative to each other, such that the data in the first and second data packets can be fused in time. Consider for instance the first data packet including video data and the second data packet including audio data. The video and audio data can be fused for use at a later time without significant effort to synchronize transmission of the video and audio streams. This is one example; data from two or more data packet streams may be fused respectively for any type of device including a sensor device.

III. Transmission Scheduler

The transmission scheduler 120 in accordance with one embodiment may multiplex a plurality of data packet streams associated with a plurality of data sources 150, 152 to generate a multiplexed data packet stream for transmission via the physical link 202. Any type of data packet may be provided in the data packet steams associated with the plurality of data sources 150, 152. For instance, the data packet streams may not include the same type of data packet—e.g., one data packet stream may include data packets of a first type, and another data packet stream may include data packets of a second type. For purposes of disclosure, the data packet streams from the plurality of data sources 150, 152 are described in connection with providing Ethernet packets defined according to the IEEE 802.3 standard—although it should be understood that the present disclosure is not limited to data packet streams comprising Ethernet packets as data packets.

Figure 3:
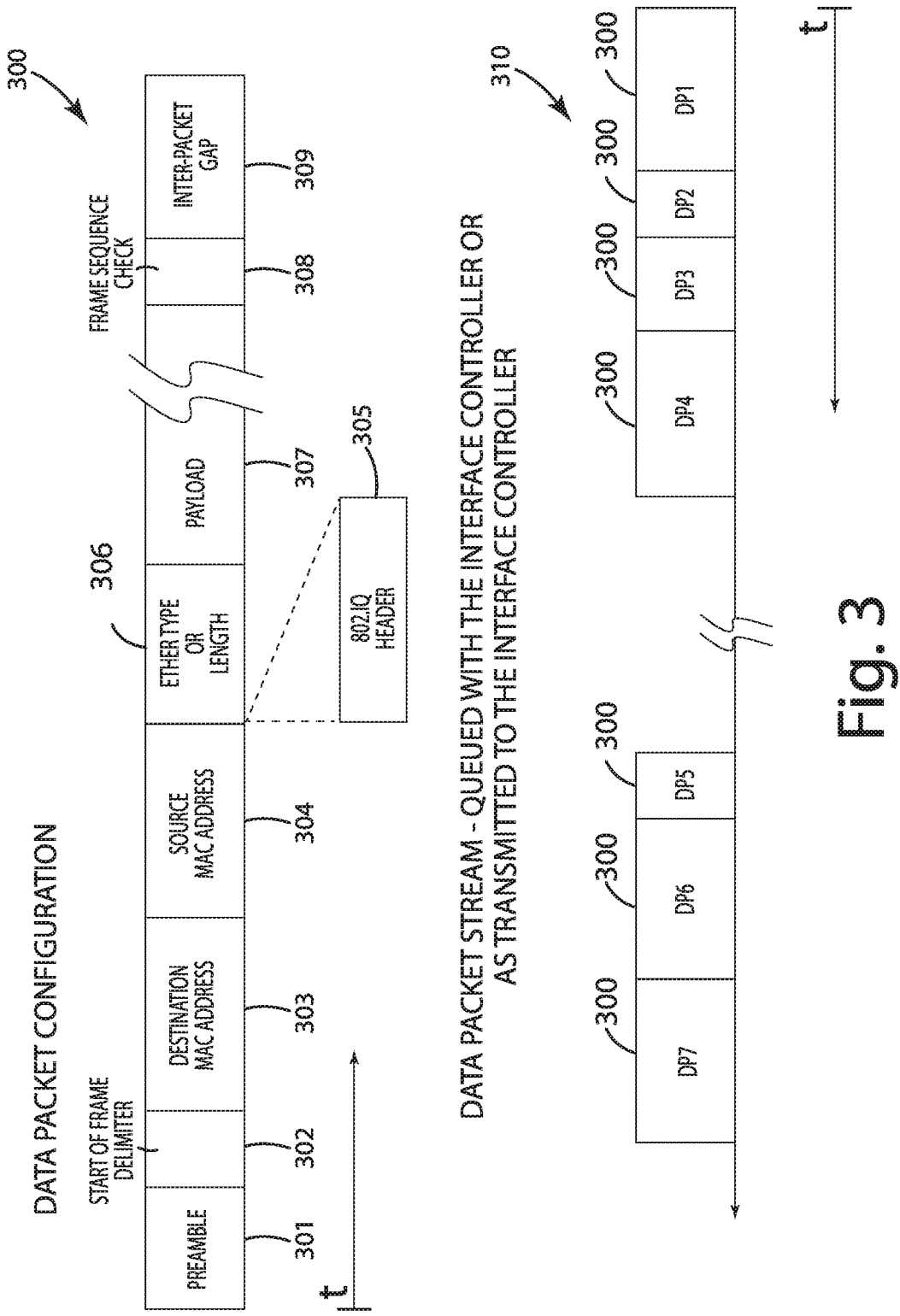
FIG. 3 shows a data packet and a data packet stream in one embodiment.

A data packet in accordance with one embodiment is shown in FIG. 3, and generally designated 300. The data packet 300 in the illustrated embodiment may be incorporated into a data packet stream 310 comprising a plurality of data packets 300. As shown in the illustrated embodiment of FIG. 3, the data packet stream 310 may include data packets 300 of different lengths, and may include dead times or gaps (other than the interpacket gap) between data packets 300 during which no data packets are ready or available for transmission. When data packets 300 are available for transmission, the data packets 300 may be multiplexed in a gapless manner. As an example, when data packets 300 are available for transmission, gapless multiplexing may be conducted such that a start byte of each data packet directly follows an interpacket gap of a prior data packet.

The data packet stream 310 is depicted with a plurality of data packets 300 ($DP_1 \ldots DP_7$) that appear to be available for transmission at specific times; however, it should be understood that, in accordance with at least one embodiment of the present disclosure, each data packet 300 of the data packet stream 310 may be generated for transmission to the transmission scheduler 120 in response to a request from the transmission scheduler 120—in this way, in one embodiment, the data packet stream 310 may vary based on both the availability of data from a data source and a determination of the transmission scheduler 120 to allow transmission of a data packet 300 from the data source 150, 152. In one embodiment, the data packet stream 310 may be generated in time by a data source 150, 152 as shown in FIG. 3, but the data packets 300 may be placed in a queue to be multiplexed with one or more other data packet streams.

The data packet 300 may be an Ethernet packet including a plurality of bytes structured to incorporate one or more of the following fields: a preamble 301, a start of frame delimiter 302, a destination address 303, a source address 304, an 802.1Q tag (for VLAN-tagged packets), a length 306 (or type), a payload 307, a frame sequence check 308 (e.g., a cyclic redundancy check or error-detecting code), and an interpacket gap 309 also described as an interpacket space. In the illustrated embodiment, the data packet 300 is variable in length such that a number of bytes associated with the data packet 300 may vary over time within a data packet stream 310. For instance, nearly all of the fields in the data packet 300 are fixed in length with the exception of the payload 307 as shown by the broken lines. Several of the fields utilized in the Ethernet packet, such as the destination and source addresses and the preamble, are conventional and therefore the purpose and bit size of these fields are not described in further detail—however, it should be understood that the purpose, bit size, or data, or a combination thereof, of any one or more of these fields may form the basis for a determination of the transmission scheduler 120 to schedule transmission of a data packet into an output stream.

The transmission scheduler 120 in the illustrated embodiment may control an output stream (also described herein as a multiplexed data packet stream) based at least in part on presence and/or data included in one or more of the fields of the data packet 300. For instance, the transmission scheduler 120 may detect presence of the interpacket gap 309 following the payload 307 and frame sequence check 308, and determine to initiate transmission of another data packet for the output stream during this interpacket gap 309.

The transmission scheduler 120 may determine whether to initiate or schedule transmission of a data packet from the data packet stream 310 based on one or more criteria related to a field of that data packet or another data packet, including criteria related to the data packet currently being transmitted. For instance, the transmission scheduler 120 may use the value of the priority code point (PCP) or drop eligible indicator (DEI) in the 802.1Q tag of VLAN-tagged data packets to determine transmission scheduling priority.

Turning to the illustrated embodiment of FIGS. 4 and 5, the transmission scheduler 120 and the multiplexing of a plurality of data streams 310 into an output stream 320 is shown for one embodiment. For purposes of disclosure, the illustrated embodiment of FIGS. 4 and 5 focus on multiplexing data packet streams 310 from first and second data sources 150, 152. However, it should be understood that more than two data packet streams 310 may be multiplexed into the output stream 320. The methodology described herein may scale to multiplex any number of data packet streams 310, including eight data packet streams or greater.

In the illustrated embodiment of FIG. 4, the output stream 320 is shown initially with hatching during which one or more higher-priority data packets are transmitted prior to data packets 300 being generated or becoming available from the first and second data sources 150, 152. For purposes of disclosure, data packets 300 generated from the first data source 150 have strict priority over data packets 300 from the second data source 152. This priority scheme is provided in the illustrated embodiment to facilitate understanding with respect to the transmission scheduler 120 determining priority with respect to data packets in a gapless manner. It should be understood, however, that prioritization for data packet streams may be different and may vary among different data packet streams.

As can be seen in FIG. 4, the size or length of the data packets 300 within each data packet stream 310 varies. For instance, the data packet Dia from the first data source 150 is longer than the data packet $D_{22}$ from the second data source 152.

It should be noted that the length depicted in the illustrated embodiment of FIG. 4 for each of the data streams 310 from the first and second sources 150, 152 corresponds respectively to the amount of time to communicate the data packet streams from the first and second data sources 150, 152 to the transmission scheduler 120 via the data source interface 160. In practice, this amount of time may be significantly less than shown in FIG. 4 because the bandwidth of the data source interface 160 may be larger, possibly several factors larger, than the bandwidth available to the output stream 320. This difference can be seen in the length with respect to the data packet $D_{14}$ in FIG. 4 and FIG. 5. The data packet $D_{14}$ in FIG. 5 is more representative of the relative time or duration to transmit a data packet 300 from the first data source 150 to the transmission scheduler 120 and the duration to transmit the same data packet 300 via the output stream 320. In this way, FIG. 4 can be considered representative of the data packet streams 310 output from the first and second data sources 150, 152.

In the illustrated embodiment of FIGS. 4 and 5, the output stream 320 is generated by the transmission scheduler 120 by multiplexing the data packet streams 310 from the first and second data sources 150, 152. The transmission scheduler 120 gives priority to the data packet stream 310 from the first data source 150 as shown by the first three data packets ($D_{11}$, $D_{12}$, $D_{13}$) of the output stream being from the first data source 150. In the illustrated embodiment, as data packet $D_{13}$ is almost completely transmitted via the communications control circuitry 130, a new data packet $D_{14}$ becomes available from the first data source 150. Because data from the data source 150 has priority over the second data source 152, the transmission scheduler 120 schedules data packet $D_{14}$ ahead of data packet $D_{21}$ from the second data source 152.

It should be noted that the length or duration of data packets 300 being transmitted in the output stream 320 via the communications control circuitry 130 is variable. As a result, there may be cases during which the transmission scheduler 120 may be unaware of when a data packet 300 that is currently being transmitted has completed transmission. In this case, if the transmission scheduler 120 determines the next scheduled data packet before the end of the currently transmitted data packet, there is a chance that a higher priority data packet would be preempted by the previously scheduled data packet. In other words, if the higher priority data packet arrives after the transmission scheduler 120 has determined the next scheduled data packet but before the next scheduled data packet is transmitted, the higher priority data packet would be preempted by the next scheduled data packet. The transmission scheduler 120 in accordance with one embodiment may avoid this preemption by determining scheduling with respect to data packets at a rate that is equal to or faster than the medium transfer rate.

The illustrated embodiment of FIG. 5 depicts the transmission scheduler 120 operating at a rate greater than or equal to the medium transfer rate. As can be seen, and as discussed above, data packet $D_{14}$ becomes available during the interpacket gap 309 of the preceding data packet $D_{13}$. If data packet $D_{14}$ had not become available before or during this interpacket gap 309, lower priority data from the second data source 152 would be scheduled for transmission. Because the transmission scheduler 120 schedules at an interval greater than or equal to the medium transfer rate, and because the data packet $D_{14}$ becomes available for transmission at least one byte interval before the next data packet would be transmitted, the transmission scheduler 120 determines to transfer the data packet $D_{14}$ instead of the lower priority data from the second data source 152.

Several byte intervals of the medium transfer rate are depicted in the illustrated embodiment of FIG. 5 during transmission of the interpacket gap 309 of the output stream 320. In the case of an Ethernet packet, the interpacket gap 309 is 12 octets or 12 8-bit bytes. The transmission scheduler 120 may determine during each byte interval, whether to schedule a data packet for transmission. For instance, in the illustrated embodiment, during the twelfth interval, the data packet $D_{14}$ becomes available and the transmission scheduler 120 determines to schedule the data packet $D_{14}$ for transmission.

As discussed herein, the communication interface controller 110 may utilize one or more queues for the plurality of data sources 150, 152 to facilitate scheduling of data packet streams from each of the sources. In this case, the data source interface 160 may control the flow of data into a respective queue in response to receipt of a control signal (DATA VALID) from the data source 150, 152 indicating the data source 150, 152 has at least one data packet ready to transmit. The data source interface 160 may direct data packets from each data source 150, 152 based on the DATA VALID signal for the data source 150, 152 being active, as shown in the illustrated embodiments of FIGS. 4 and 5.

Alternatively, or additionally, the communication interface controller 110 may utilize backpressure (optionally with no use of a queue or buffering in the communication interface controller 110 for data packets from each respective data source 150, 152) to control the flow of data from the plurality of data sources 150, 152. This may enable the communication interface controller 110 to control which data packet stream 310 is actively being transmitted via the output stream 320, and enable the data source 150, 152 to be aware of whether its data packet stream 310 is currently being transmitted. Each of the data sources 150, 152 and the communication interface controller 110 in one embodiment may utilize a handshaking protocol of the data source interface 160 to control the flow of data packets 300 in this backpressure mode.

For instance, as shown in phantom lines in the illustrated embodiment of FIGS. 4 and 5, each data source 150, 152 may assert its DATA VALID signal during a period which the data source 150, 152 has data packets 300 available to transmit. The transmission scheduler 120 may determine which data packets 300 from which data source 150, 152 to schedule based on the state of the DATA VALID signals for each of the data sources 150, 152. In FIG. 5, the DATA VALID signal for the first data source 150 remains active or transitions to active at least one interval of the medium transfer rate before the next scheduled packet is to be transmitted.

In one embodiment, the backpressure methodology may avoid substantial use of external memory such that the transmission scheduler 120 may scale to multiplexing a large number of data sources 150, 152 (e.g., eight or greater) while facilitating transmission on the physical link 202 of the multiplexed output stream.

Although the transmission scheduler 120 is described in connection with the illustrated embodiments of FIGS. 4 and 5 as utilizing strict priority of the first data source 150 over the second data source 152, it should be understood that the one or more criteria for determining priority may be different. The one or more criteria for priority of a data packet stream 310 in one embodiment may be associated with a QoS for that data packet stream 310. In one embodiment, as discussed herein, the plurality of data sources may correspond to talkers in an FQTSS compliant system that supports at least two traffic classes or QoS classes—a strict priority class and a credit-based shaper class.

In one embodiment, the first data source 150 may be associated with a first priority class, and the second data source 152 may be associated with a second data class. In one embodiment, the first priority class may be one of a credit-based priority class or a strict priority class. And, the second priority class may be one of the credit-based priority class or strict priority class. In one embodiment, the priority class associated with a data source 150, 152 may be similar or the same type as a priority class associated with another data source 150, 152, but where each of the similar priority classes includes one or more parameters that affect their relative priority with respect to each other. For instance, in a credit-based priority approach, one data source 150, 152 may be assigned a larger amount of credit than another data source that is also assigned to a credit-priority class.

The transmission scheduler 120, in one embodiment, may determine to schedule transmission of a data packet 300 from one of the plurality of data packet streams 310 based on one or more criteria for a priority class that is associated with each of the data packet streams 310. The priority selection algorithm or algorithms, also described as a transmission selection algorithm, may vary from application to application, and may include at least one of a strict priority algorithm and a credit-based shaper algorithm, both of which are described in IEEE 801.1Q-2014 (2014)—the disclosure of which is incorporated herein by reference in its entirety.

For instance, in one embodiment, a data packet 300 from the plurality data packet streams 310 may be scheduled for transmission if and only if 1) operation of the priority selection algorithm supported by a queue and/or a data source determines that there is a data packet available for transmission, and 2) for each queue and/or data source corresponding to a numerically higher value of traffic class supported by the transmission scheduler 120, the operation of the transmission selection algorithm supported by that queue and/or data source determines that there is no frame available for transmission.

In the illustrated embodiment, the priority of a data packet stream may be configured at design time and remain static during operation. Whether a data packet stream is selected over another data packet stream may be determined in accordance with a priority selection algorithm. An example priority selection algorithm includes selecting the highest priority credit-based queue with 1) data pending and 2) positive credits. If both of these criteria are not satisfied, the algorithm may select the highest priority strict priority queue that has data pending.

The strict priority algorithm in one embodiment may be based on a numerical value that is assigned to each of the data sources 150, 152 and/or a queue associated with one or more data sources 150, 152. The higher the numerical value, the greater the priority for data packets 300 assigned the numerical value. If the strict priority algorithm determines a candidate data packet 300 is ready for transmission and no other data packets 300 having a higher numerical value from a strict priority data source and no other data packets 300 from credit-based data source have positive credits are ready for transmission, the transmission scheduler 120 may schedule transmission of the candidate data packet 300.

The credit-based shaper algorithm in one embodiment may be based on a determination that 1) a data source or queue includes one or more data packets 300 ready for transmission, and 2) a number of credits associated with that data source or queue is positive.

In one embodiment, whether the number of credits is possible may be determined based on the state of a transmit-allowed signal for the data source or queue. The order or priority for which the data source or queue is transmitted may be pre-assigned based on the numerical value associated with the data source or queue. One or more criteria may be analyzed in accordance with the algorithm to affect whether the transmit-allowed signal is enabled. These criteria may include 1) a transmission rate in bits per second, and 2) an idle slope defined as a rate of change of credit in bits per second, where the value of the credit increases at the idle slope while data packets from the data source or queue are not being transmitted. The idle slope may not exceed the transmission rate, but in many cases, the idle slope is defined as some value less than the transmission rate based on at least one of 1) a priority of the data source or queue and 2) an amount or percentage of available bandwidth allocated to the data source or queue.

The credit-based shaper algorithm may utilize one or more additional criteria in determining whether to set the transmit-allowed signal, including a transmit signal, a credit value, and a send slope. The transmit signal may be enabled while the output stream is transmitting data packets from the data source or queue and disabled otherwise. The credit value or transmission credit, defined by a number of bits, may indicate the currently available number of credits for the data source or queue. The credit value may be reset to zero if there are no data packets available to send, the transmit signal is disabled, and the credit is positive.

The send slope may be a rate of change of credit, in bits per second, such that the value of credit decreases at a rate equal to the send slope while the transmit signal is enabled. The send slope may be equal to the idle slope minus the transmission rate.

For the credit-based shaper algorithm, the transmit-allowed signal may be enabled while the credit value is zero or positive, and disabled when the credit value is negative.

In one embodiment, one or more criteria associated with a priority selection algorithm may be run-time configurable. For instance, the one or more parameters of the credit-based shaper algorithm may be set at run-time. Idle slope, send slope, a high credit limit or a low credit limit, or any combination thereof, may be configurable to allocate bandwidth from 0% to 100% of the available bandwidth of the physical link 202 (e.g., 0 MB per second to 125 MB per second for a 1 Gbps link).

In one embodiment, the allocation accuracy may be 1 byte per second. In other words, the credit-based shaper algorithm may determine available credits at a resolution equal to or more precise than the number of bits transferred per interval of the medium transfer rate. This way, the credit-based shaper algorithm may more accurately determine which of a plurality of data packet streams 310 has higher priority at any given interval of the medium transfer rate. For instance, for each byte of the interpacket gap 309 of a data packet 300 that is being transmitted, the credit-based shaper algorithm may determine which of the plurality of data packet streams 300 has priority based on the number of bytes or corresponding credits at that given time. The number of bytes or corresponding credits may change for each byte transmitted.

In an alternative embodiment, whether a particular data source or queue has a numerically higher value than another data source or queue may vary over time—e.g., in the case of a credit-based shaper algorithm, the numeric value or priority level of a data source may decrease as the credit-based shaper algorithm determines a data source or queue has depleted its available credit at a given time. Additionally, or alternatively, the credit-based shaper algorithm may determine that no data packet is available to transmit after credit has been depleted for an associated data source or queue.

In one embodiment, the transmission scheduler 120 may enable 100% bandwidth utilization with respect to a plurality of data packet streams 310. The allocation accuracy being equal or more precise than the number of bits transferred per interval of the medium transfer rate and the scheduling rate being equal to or greater than the medium transfer rate may facilitate multiplexing data packet streams with 100% bandwidth utilization and based on the credit-based shaper algorithm.

In one embodiment, the standard for FQTSS may indicate that up to 75% of bandwidth may be reserved, possibly excluding the interpacket gap 309 and the preamble 301. In cases where the interpacket gap 309 and preamble 301 are not included in the reserved bandwidth, the amount of unreserved bandwidth for overhead may be substantially unknown due to variations in packet size. As a result, in this case, bandwidth that would otherwise be allocated to strict priority queues may be reserved instead to cover the overhead of credit-based queues.

Alternatively, if the interpacket gap 309 and preamble 301 are included in the reserved bandwidth, the transmission scheduler 120 may allow 100% utilization of the bandwidth for credit-based queues or strict priority queues, or any combination thereof.

The transmission scheduler 120 in accordance with one embodiment may provide gapless or substantially gapless multiplexing of data packet streams 310 from a plurality of data sources 150, 152 to generate an output stream for transmission from an endpoint. The transmission scheduler 120 may determine whether to schedule a data packet 300 from the data packet streams 310 before and/or during an interpacket gap 309 associated with the data packet 300 currently being transmitted. In one embodiment, the transmission scheduler 120 may determine whether to schedule a data packet 300 from the data packet streams 310 at a rate that is greater than or equal to the medium transfer rate (e.g., if the medium transfer rate is 125 MBps, the transmission scheduler 120 may determine whether to schedule a data packet at a rate of 125 million times per second or faster. In one embodiment, the transmission scheduler 120 may support multiplexing of data packet streams 310 from a plurality of data sources 150, 152 in accordance with one or more priority algorithms. The transmission scheduler 120 may multiplex or schedule data packets for transmission in an output stream 320 at a frequency equal to or greater than the link speed (e.g., 125 MHz or a period of 8 ns for a 1 Gbps link). This mode of operation in one embodiment may provide substantially accurate switching between the prioritized data sources and substantially eliminate gaps between data packets 300 when multiplexing the plurality of data packet streams 310 generated from the plurality of data sources 150, 152. Even infrequent transmission of a minimum size data packet 300 from each of the plurality of data sources 150, 152 may not adversely affect latency with respect to such data packets 300.

In one embodiment, the transmission scheduler 120 may avoid wasting a significant amount of bandwidth that might otherwise occur if the transmission scheduler 120 were to operate at a rate less than the medium transfer rate, such as at the conventional 125 us interval. For instance, by operating in a gapless mode, the transmission scheduler 120 may avoid circumstances that result in lost bandwidth, such as switching between transmission of relatively small data packets (possible data packets that are shorter in transmission duration than the scheduling rate) of different priority classes or traffic classes. The amount of lost bandwidth in this circumstance may depend on the number of queued data packets for each traffic class and the total size of the queued data packets. For instance, lost bandwidth may occur under one or more of the following conditions:

Data packet queuing is not implemented or not feasible;
The rate of data packets being transmitted for a particular traffic class is less than the scheduling rate or frequency; or
The total length of queued packets for a particular traffic class cannot be transmitted evenly within the interval defined by the scheduling rate.

Lost bandwidth due to these conditions may be substantial, particularly for lower strict-priority traffic. In one configuration, this type of lost bandwidth may adversely affect time-critical devices or data sources that transmit data packets at specific intervals and attempt to minimize buffering to reduce or minimize latency between the endpoint (e.g., a producer) and an external device (e.g., a consumer) in an effort to maximize determinism.

In one embodiment, the transmission scheduler 120 operates in a gapless mode to substantially avoid lost bandwidth caused by the conditions listed above. This way, regardless of the transmission interval utilized by a data source 150, 152 for transmitting data packets 300 and regardless of the size of data packets being transmitted, the transmission scheduler 120 can enhance or maximize determinism with respect to the data packets 300 being generated from a data source 150, 152.

IV. Time Management

As discussed herein, in one embodiment, the communication interface controller 110 may include a time manager 140 that synchronizes and syntonizes a local clock of the communication interface controller 110 to a grand master clock associated with an external device 210. The time manager 140 may transmit time related messages indicative of the time of the local clock to another external device 210 considered to be a neighbor of the communication interface controller 110. The communication interface controller 110 may include the time manager 140 without a gapless transmission scheduler in accordance with one embodiment.

The gPTP (IEEE 802.1AS-rev) protocol may involve exchange of several time-stamped messages between neighboring time-aware nodes on a network to facilitate accurate propagation of a grand-master's time. Each node may transmit pdelay request messages, and each node may respond to a pdelay request message by transmitting pdelay response (and optionally transmitting a pdelay response follow-up message for 2-step timestamping).

The timestamps included in the pdelay request messages may be used by each node to calculate the propagation delay relative to its neighbor node and the ratio of the node's clock to the neighbor node's clock. Sync messages (and optionally sync follow-up messages for 2-step timestamping) that contain the grand-master time (i.e., precise origin timestamp) and a cumulative rate offset may be sent by the grand-master to its neighbor node and from neighbor to neighbor for every hop along the route to a receiving node. The receiving node may use its neighbor propagation delay and its neighbor rate ratio that is added to the cumulative rate offset to adjust the grand-master timestamp to synchronize the local clock.

The time manager 110 may be a hardware-based implementation of the gPTP protocol in which the communication interface controller 110 includes logic circuitry configured to carry out the entire gPTP slave protocol defined in IEEE 802.1AS and IEEE 802.1AS-REV—the disclosures of which are herein incorporated by reference in their entirety. The logic circuitry may be embodied in a programmable logic device (PLD), such as an FPGA, or an ASIC. With this approach, as opposed to a conventional software driven gPTP slave, packet parsing, processing, sending, and responding to pDelay (propagation delay) requests, and all calculations for gPTP may be performed in the logic circuitry. This may offload a significant processing burden for the one or more data sources 150, 152 and/or other components coupled to the communication interface controller 110 that implement the gPTP.

For purposes of discussion, the term syntonize is used to identify alignment in phase of ticks of two or more clocks, and the term synchronize is used to identify alignment in frequency of ticks of two or more clocks.

The gPTP protocol in one embodiment may involve transmission of a pDelay request to another device, and responding to the pDelay request with a gPTP response. The pDelay request may be timestamped according to the clock of the transmitting device, and the gPTP response may be timestamped according to the clock of the responding device. Optionally, the responding device may send a gPTP follow-up message with the timestamp of the gPTP response, and transmit the gPTP response without a timestamp in an attempt to reduce residence time. Based on these timestamps, the communication interface controller 110 may identify and account for discrepancies between the two clocks.

In one embodiment, the local clock of the communication interface controller 110, which is aligned with the grand master clock of the external device 210, may be distributed via the data source interface 160 to facilitate synchronous operation of the one or more data sources with respect to the communication interface controller 110. This way, data packets and/or time-based interrupts that occur on the plurality of data sources 150, 152 may be synchronized and syntonized to the same clock.

In one embodiment, the time manager 140 may align transmission of gPTP messages, including pDelay requests, with the synchronized and syntonized time and with a period equal to the log message interface and a jitter of less than 13 us (depending on the size of any previously scheduled transmission). The precise alignment of gPTP message transmissions to synchronized network time allows the next transmission time to be known a priori such that the transmission scheduler 120 can ensure that the transmission of another outgoing packet does not preempt the transmission of a gPTP message. The time manager may transmit a response to a pDelay request and transmit follow-up messages immediately after receiving the pDelay request to reduce or minimize residence time or the amount of time that the request remains in the communication interface controller 110 queued for response.

The time manager 140 in one embodiment may synchronize and syntonize the local clock of the communication interface controller 110 to the grand master clock by calculating a master-local offset (MLO). The MLO may be calculated in according to the following formula:

$$MLO = NPDPeer * \frac{syncCSROGM + NRR}{NRR} + syncPOTSCorrGM_n - syncIngressLoc_n$$

Where:
NPDPeer is the neighbor propagation delay with respect to a peer time-base;
NRR is the neighbor rate ratio;
syncCSROGM is the cumulative scaled rate offset with respect to the grand master time-base from the most recently received follow-up Type, Length, Value (TLV) message;
$syncPOTSCorrGM_n$ is the corrected, substantially precise origin timestamp with respect to the grandmaster time-based from the most recently received time message; and
$syncIngressLoc_n$ is the ingress timestamp with respect to the local time-base of the most recently received sync message.

In one embodiment, the time manager 140 may compare the MLO to a predetermined threshold. If the MLO exceeds the threshold, the time manager 140 may set the local clock to the grandmaster time by adding the MLO to the current local clock value. If the MLO is within the threshold, a proportional integral (PI) loop may calculate a new local clock increment by trying to minimize MLO as the error term. New local clock increments may update at a frequency equal to or greater than the medium transfer rate or link data rate (e.g., the clock increment may adjust at 125 MHz for a 1 Gbps link). In other words, the time-step size of the PI loop may be equal to or less than the period of the medium transfer rate (e.g., 8 ns or less).

The MLO in one embodiment may be determined after receipt of a gPTP sync follow up TLV (two-step), or an optional sync TLV (one-step). As discussed herein, the MLO may be compared against a threshold to determine whether to a) adjust the local time clock directly against the grandmaster time for a coarse adjustment or b) adjust the clock increment value for a fine adjustment based on the MLO and the PI loop. For coarse adjustments, the new local clock time is determined either by adding the MLO to the current local clock value or by setting the local clock directly to the grand master time as provided by the preciseOriginTimestamp in the received sync message or sync follow-up message.

For a fine adjustment, a new clock increment value may be determined based on output from the PI loop focused on reducing or minimizing the MLO as the error term. The clock increment base value (e.g., 8 ns) may be scaled up to $2^{24}$ to facilitate fine adjustments.

The new clock increment may be determined in one embodiment according to the following:

$$newInc(t) = baseInc + K_p e(t) + K_i \int_{t_0}^{t} e(\tau) d\tau$$

Where:
newInc is the new clock increment value;
baseInc is the base clock increment value (e.g., 8000000016);
$K_p$ is the proportional gain constant (e.g., $3.0 \times 2^{16}$);
e(t) is the most recently calculated MLO value representing the error;
$K_i$ is the integral gain constant (e.g., $0.3 \times 2^{16}$);
t is the present time;
$t_0$ is the initialization time of the calculation.

The proportional and integral gain constants may be modified either statically or dynamically for a given application. The gain constants may be modified to reduce or minimize convergence time and enhance or maximize clock stability and accuracy.

In one embodiment, the PI loop may be instantiated in hardware or circuitry of the time manager 140—additionally, or alternatively, one or more aspects of the time manager 140 may be performed on a soft-core processor (e.g., a MicroBlaze® soft-core for a Xilinx FPGA). Time stamps, MLO calculations, or PI loop feedback calculation, or any combination thereof, may be calculated through use of high-precision ones-complement arithmetic with 128-bit values that represent full epoch timestamps scaled up by $2^{16}$ ($2^{-16}$ ns). Ratios may also be stored and applied in a $2^{16}$ scaled form to avoid floating point arithmetic. This hardware configuration may be implemented with 32-bit operations, and facilitate storage and calculations with ratios expressed as floating point values without a processor configured for floating point arithmetic but substantially maintaining a high degree of accuracy.

In one embodiment, the hardware configuration of the time manager 140 may be configured to perform calculations for the MLO and/or the PI loop immediately following receipt of a gPTP related message, and optionally immediately following receipt of a field within the message that forms the basis for the calculation. In this way, even before the complete gPTP related message has been completely received, the time manager 140 may be utilizing data of the gPTP related message for analysis.

The PI loop and MLO calculation may facilitate achieving rapid convergence to the grandmaster time. For instance, the communication interface controller 110 may be configured to synchronize and syntonize the local time, to within two times the interval of the medium transfer rate (e.g., 16 ns), to the grandmaster time in less than 10 seconds for a double hop connection. Systems and devices that incorporate the communication interface controller 110 with the time manager 140 may be agnostic of the time-synchronization implementation, and may not need to allocate significant resources (e.g., processor time or memory) to implement the gPTP protocol.

It should be noted that the PI loop instantiated in the time manager 140 may facilitate convergence to the grandmaster time in both frequency (synchronized) and offset (syntonized) to full epoch time. This is in contrast to conventional methodologies that utilize a time counter register with resolution less than full epoch time, that only syntonize or only synchronize to the grand master.

In one embodiment, the time manager 140 of the communication interface controller 110 may facilitate a hardware implementation of an IEEE 802.1AS-compatible slave to synchronize and syntonize to a grandmaster clock over a computer network. This approach may avoid the limitations and inefficiencies of a software-based approach. The time manager 14 in one embodiment may maintain a local clock in epoch time scaled up by $2^{16}$ ($2^{-16}$ ns) as a grandmaster synchronized and syntonized local clock. This local clock may be free running, in one embodiment, with the last computed local clock increment if the grandmaster clock becomes unavailable or is not present. This local clock in epoch time, possibly scaled up by $2^{16}$ ($2^{-16}$ ns), that is being managed by the time manager 140 may be available to any system element with access to the hardware of the communication interface controller 110.

In one embodiment, the time manager 140 may identify data packets related to the gPTP protocol as they are received by a receiver engine, similar to the one depicted in the illustrated embodiment of FIG. 2. The time manager 140 may verify sequence numbers of the gPTP related data packets as the data packets stream in from the physical link 202, and extract fields of interest for time-synchronization calculations.

The time manager 140 may respond automatically to pDelay requests included in the gPTP related data packets. The gPTP response may be generated and transmitted as the next packet to be sent by the communications control circuitry 130. This generation of the gPTP response may be conducted without software intervention, and may achieve substantially low residence time. In one embodiment, the gPTP response may be generated and begin being transmitted within a time period less than twice the interval of the medium transfer rate, possibly less than or equal to the interval of the medium transfer rate.

In one embodiment, a gPTP response packet may be transmitted as the gPTP response packet is being assembled, thereby reducing residence time. For instance, earlier bits of the gPTP response packet may be transmitted while later bits have yet to be determined by the time manager 140.

The time manager 140 may be configurable, as discussed herein, to schedule one or more timer based interrupts or triggers based on the local clock, which is substantially syntonized and substantially synchronized to the grand master clock. These one or more triggers may associate any type of event or output with a time of the local clock. For instance, the one or more triggers may be associated with the interval for transmitting pDelay requests to a neighbor device. As another example, the one or more triggers may provide a control signal to logic circuitry of the communication interface controller 110 or another device, possibly external to the communication interface controller 110. The one or more triggers may be set according to an interval and/or according to a specific time of the local clock such that the event associated with a particular trigger may be initiated in response to the local clock being equal to the specific time.

In yet another example, the one or more synchronized triggers may be used to clock downstream logic, processing elements, or even an external (to the logic circuitry of an FPGA) physically-connected device/hardware. This may facilitate operating one or more devices in a lock-step manner. As an example, the one or more synchronized triggers may facilitate operating in a synchronized manner such that events or processes on one or more devices may occur in a deterministic manner with respect to one or more other events or processes of another device.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. An interface controller for controlling communications from an endpoint on a physical link, the interface controller comprising:
   communications control circuitry configured to direct transmission circuitry to transmit data bytes on the physical link, wherein the data bytes are transmitted on the physical link at a medium transfer rate according to an endpoint signaling protocol;
   a data transfer interface configured to control receipt of first and second data packet streams via one or more data source physical links, each of the first and second data packet streams being provided by a data source and including a plurality of data packets, wherein at least one first data packet of the first data packet stream and at least one second data packet of the second data packet stream have different lengths;
   a transmission scheduler operably coupled to the communications control circuitry and the data transfer interface, the transmission scheduler configured to multiplex the plurality of data packets from the first and second data packet streams to generate an output stream fed to the communications control circuitry for transmission on the physical link;
   wherein the transmission scheduler multiplexes the plurality of data packets from the first and second data packet streams at a rate that is equal to or greater than the medium transfer rate;
   wherein the transmission scheduler determines which data packet from the first and second data packet streams to provide to the output stream during an interpacket gap associated with the endpoint signaling protocol; and
   wherein following each byte of data in a preceding data packet, the transmission scheduler determines if the interpacket gap is present, wherein if the interpacket gap is present, the transmission scheduler determines whether to schedule transmission of a data packet from one of the first and second data packet streams such that the transmission scheduler multiplexes data packets at a rate equal to or greater than the medium transfer rate, wherein if no interpacket gap is detected, the transmission scheduler waits until after another byte of data has been transmitted to determine if the interpacket gap is present.

2. The interface controller of claim 1 wherein the one or more data source physical links facilitate communications according to a data signaling protocol that is different from the endpoint signaling protocol.

3. The interface controller of claim 1 wherein the plurality of data packets from the first and second data packet streams are multiplexed based on a first priority class for the first data packet stream and a second priority class for the second data packet stream.

4. The interface controller of claim 1 wherein at least one additional data packet stream is provided respectively by at least one additional data source, wherein each of the at least one additional data packet streams includes a plurality of data packets;
   wherein the transmission scheduler is configured to multiplex the plurality of data packets from the first data packet stream, the second data packet stream, and the at least one additional data packet stream to generate the output stream fed to the communications control circuitry; and
   wherein the transmission scheduler multiplexes the plurality of data packets from a plurality of data packet streams based on a priority class associated with each data packet stream of the plurality of data packet streams.

5. The interface controller of claim 1 wherein a byte length of the preceding data packet that precedes the interpacket gap is variable.

6. The interface controller of claim 1 wherein in a time between transmission of a first byte of data and transmission of a second byte of data, a high priority data packet is output from the data source for the first data packet stream, and wherein the interpacket gap follows the second byte of data.

7. The interface controller of claim 1 wherein the data transfer interface is configured to control receipt of the first and second data packet streams in a queue-less mode.

8. The interface controller of claim 7 wherein the data transfer interface permits the data source for each of the first and second streams to transmit a data packet to the interface controller in response to a) determining that the data packet is available from the data source and b) a determination from the transmission scheduler to transmit the data packet for transmission on the physical link.

9. The interface controller of claim 1 wherein the data source for each of the first and second streams and the transmission scheduler are synchronized to the same clock such that the first and second data packet streams generate data packets whose bytes are substantially aligned in time.

10. An interface controller for controlling communications from an endpoint on a physical link, the interface controller comprising:

communications control circuitry configured to direct transmission circuitry to transmit data bytes on the physical link, wherein the data bytes are transmitted on the physical link at a medium transfer rate according to an endpoint signaling protocol;

a data transfer interface configured to control receipt of first and second data packet streams via one or more data source physical links, each of the first and second data packet streams being provided by a data source and including a plurality of data packets, wherein at least one first data packet of the first data packet stream and at least one second data packet of the second data packet stream have different lengths;

a transmission scheduler operably coupled to the communications control circuitry and the data transfer interface, the transmission scheduler configured to multiplex the plurality of data packets from the first and second data packet streams to generate an output stream fed to the communications control circuitry for transmission on the physical link;

wherein the transmission scheduler multiplexes the plurality of data packets from the first and second data packet streams at a rate that is equal to or greater than the medium transfer rate;

wherein the data source for each of the first and second streams and the transmission scheduler are synchronized to the same clock such that the first and second data packet streams generate data packets whose bytes are substantially aligned in time;

wherein the data source for each of the first and second data packet streams are synchronized to a clock signal provided by the interface controller;

wherein the first data packet stream corresponds to data output from a first sensor;

wherein the second data packet stream corresponds to data output from a second sensor; and wherein the data output from the first sensor is fusible with the data output from the second sensor despite the data output from the first sensor being transmitted via the physical link at a different time than the data output from the second sensor.

11. An interface controller for controlling communications on a physical link, the interface controller comprising:

communications control circuitry configured to direct transmission circuitry to transmit data bytes on the physical link, wherein the data bytes are transmitted on the physical link according to a physical link signaling protocol;

a data transfer interface configured to control receipt of first and second data packet streams via one or more data source physical links, each of the first and second data packet streams being provided by a data source and including a plurality of data packets;

wherein the one or more data source physical links facilitate communications according to a data signaling protocol that is different from the physical link signaling protocol;

a transmission scheduler operably coupled to the communications control circuitry and the data transfer interface, the transmission scheduler configured to multiplex the plurality of data packets from the first and second data packet streams to generate an output stream fed to the communications control circuitry for transmission on the physical link;

wherein the data transfer interface permits the data source for each of the first and second streams to transmit a data packet to the interface controller in response to a determination from the transmission scheduler to transmit the data packet on the physical link;

wherein data bytes are transmitted on the physical link at a medium transfer rate, wherein the transmission scheduler is configured to determine scheduling of data packets at an interval rate equal to or greater than the medium transfer rate; and wherein the medium transfer rate is 125 MHz such that the physical link supports transmission of 125 million bytes per second, and wherein the interval rate is 125 MHz such that the transmission scheduler determines scheduling of data packets from the first and second data packet streams at least every 8 ns.

12. The interface controller of claim 11 wherein the data source for each of the first and second data packet streams and the transmission scheduler are synchronized to the same clock such that the first and second data packet streams generate data packets whose bytes are substantially aligned in time.

13. The interface controller of claim 11 wherein the data transfer interface activates a control signal to permit the data source to transmit the data packet to the interface controller.

14. The interface controller of claim 11 wherein the data source for each of the first and second data packet streams is blocked from transmitting the data packet to the interface controller until after the data transfer interface permits the data source to transmit the data packet.

15. The interface controller of claim 11 wherein at least one additional data packet stream is provided respectively by at least one additional data source, wherein each of the at least one additional data packet streams includes a plurality of data packets;

wherein the transmission scheduler is configured to multiplex the plurality of data packets from the first data packet stream, the second data packet stream, and the at least one additional data packet stream to generate the output stream fed to the communications control circuitry; and wherein the transmission scheduler multiplexes the plurality of data packets from a plurality of data packet streams based on a priority class associated with each data packet stream of the plurality of data packet streams.

16. An interface controller configured to communicate time information on a physical link, the interface controller comprising:

communications control circuitry configured to direct transmission circuitry to transmit data packets on the physical link, each of the data packets including a plurality of bytes arranged according to a data communication protocol;

time management circuitry configured to synchronize and syntonize a local clock to an external clock of a master external device based on one or more master time messages received from the master external device via the physical link, the time management circuitry configured to transmit, via the communications control circuitry, a plurality of neighbor time messages indicative of a time of the local clock to a neighbor external device;

the time management circuitry configured to transmit the plurality of neighbor time messages at a scheduled transmission interval that is aligned with the local clock;

a transmission scheduler operably coupled to the communications control circuitry, the transmission scheduler configured to schedule transmission of the plurality of neighbor time messages such that the transmission scheduler reserves times associated with the scheduled transmission interval for transmitting each of the plurality of neighbor time messages, the transmission scheduler configured to generate an output stream based on the plurality of neighbor time messages, the output stream being fed to the communications control circuitry for transmission on the physical link;

a data transfer interface configured to control receipt of first and second data packet streams via one or more data source physical links, each of the first and second data packet streams being provided by a data source and including at least one available data packet, wherein the transmission scheduler multiplexes the at least one available data packet from the first data packet stream, the at least one available data packet from the second data packet stream, and the plurality of neighbor time messages to generate the output stream;

wherein the transmission scheduler determines which data packet from the first data packet stream, the second data packet streams, and the plurality of neighbor time messages to provide to the output stream during an interpacket gap; and wherein following each byte of data in a preceding data packet, the transmission scheduler determines if the interpacket gap is present, wherein if the interpacket gap is present, the transmission scheduler determines whether to schedule transmission of a data packet from one of the first data packet stream, the second data packet streams, and the plurality of neighbor time messages such that the transmission scheduler multiplexes data packets at a rate equal to or greater than a medium transfer rate, wherein if no interpacket gap is detected, the transmission scheduler waits until after another byte of data has been transmitted to determine if the interpacket gap is present.

17. The interface controller of claim 16 wherein the plurality of neighbor time messages are transmitted at times substantially synchronized and substantially syntonized to the external clock of the master external device.

18. The interface controller of claim 16 wherein the time management circuitry is configured to synchronize and syntonize the local clock to the external clock based on output from a feedback loop that determines a local offset relative to the external clock.

19. The interface controller of claim 16 wherein the time management circuitry is configurable to include one or more scheduled triggers that initiate an event in response to the local clock being equal to a time value.

20. The interface controller of claim 16 wherein the time management circuitry is configured to generate a response to each of the one or more master time messages directly following receipt of the each one or more master time messages, the response being transmitted on the physical link directly following receipt of the each one or more master time messages.

21. The interface controller of claim 16 wherein the local clock is syntonized and synchronized to the external clock with a margin of error less than or equal to a transmission medium rate of the physical link.

* * * * *